(12) United States Patent
Shin

(10) Patent No.: US 9,111,451 B2
(45) Date of Patent: Aug. 18, 2015

(54) APPARATUS AND METHOD FOR DRIVING GUIDE OF VEHICLE

(71) Applicant: Hyundai Motor Company, Seoul (KR)

(72) Inventor: Ki Cheol Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 39 days.

(21) Appl. No.: 14/064,475

(22) Filed: Oct. 28, 2013

(65) Prior Publication Data

US 2015/0019120 A1 Jan. 15, 2015

(30) Foreign Application Priority Data

Jul. 12, 2013 (KR) ........................ 10-2013-0082017

(51) Int. Cl.
| | | |
|---|---|---|
| *G01S 13/04* | (2006.01) | |
| *G08G 1/16* | (2006.01) | |
| *B60Q 9/00* | (2006.01) | |
| *G01C 21/36* | (2006.01) | |
| *G01C 21/00* | (2006.01) | |

(52) U.S. Cl.
CPC .............. *G08G 1/16* (2013.01); *G01C 21/3658* (2013.01)

(58) Field of Classification Search
USPC ................. 701/400, 93, 300–302; 340/425.5, 340/435–436; 342/27
See application file for complete search history.

(56) References Cited

U.S. PATENT DOCUMENTS

| | | | | |
|---|---|---|---|---|
| 6,476,731 | B1 * | 11/2002 | Miki et al. ..................... | 340/937 |
| 7,202,776 | B2 * | 4/2007 | Breed ............................ | 340/435 |
| 8,140,218 | B2 * | 3/2012 | Kawaura et al. ................ | 701/36 |
| 8,864,196 | B2 * | 10/2014 | Shamoto ....................... | 293/117 |
| 8,935,087 | B2 * | 1/2015 | Suzuki et al. ................. | 701/301 |
| 2006/0290920 | A1 * | 12/2006 | Kampchen et al. ...... | 356/139.04 |
| 2010/0318263 | A1 * | 12/2010 | Hayakawa et al. ............ | 701/41 |
| 2013/0041549 | A1 * | 2/2013 | Reeve et al. .................... | 701/28 |
| 2013/0222174 | A1 | 8/2013 | Choe et al. | |

FOREIGN PATENT DOCUMENTS

| | | |
|---|---|---|
| JP | 06-156170 | 6/1994 |
| JP | 3284845 B2 | 5/2002 |
| JP | 2005-138720 A | 6/2005 |
| JP | 2008037361 A | 2/2008 |
| KR | 10-2007-0030449 | 3/2007 |
| KR | 10-0860797 B1 | 9/2008 |
| KR | 10-2009-0080769 A | 7/2009 |
| KR | 10-2012-0037065 A | 4/2012 |

* cited by examiner

*Primary Examiner* — Yonel Beaulieu
(74) *Attorney, Agent, or Firm* — Mintz Levin Cohn Ferris Glovsky and Popeo, P.C.; Peter F. Corless

(57) ABSTRACT

An apparatus and method for a driving guide of a vehicle are provided and include a sensor unit that has at least one sensor mounted within the vehicle. In addition, a controller is configured to sense obstacles positioned at a front and side of the vehicle using sensing information received from the sensor unit and arrange data for the obstacles based on an angle to determine whether a passage is present in front of the vehicle. In addition, the controller is configured to provide the driving guide of the checked passage.

14 Claims, 10 Drawing Sheets

APPARATUS AND METHOD FOR DRIVING GUIDE OF VEHICLE

CROSS-REFERENCE TO RELATED APPLICATION

This application is based on and claims priority from Korean Patent Application No. 10-2013-0082017, filed on Jul. 12, 2013 in the Korean Intellectual Property Office, the disclosure of which is incorporated herein in its entirety by reference.

BACKGROUND

1. Field of the invention

The present invention relates to an apparatus and a method for a driving guide of a vehicle, and more particularly, to an apparatus and a method for a driving guide of a vehicle that senses other vehicles present in front of the vehicle that is being driven, determining whether a passage is present in front of the vehicle, and providing a driving guide toward the passage.

2. Description of the Prior Art

A navigation system representative of a driving guide system displays a current location of a moving body calculated using information received from a global positioning system (GPS) on a map displayed on a screen. In addition, the navigation system provides a variety of information that assists a driver in driving a vehicle, such as displaying a moving direction of the moving body, a distance up to a destination where the driver is driving, a current moving speed of the moving body, a path set by the driver prior to driving, an optimal path to the destination, and the like.

Currently, the above-mentioned navigation system is mounted on a variety of moving bodies such as a ship, an airplane, a vehicle, and the like and has been widely used to determine a current location and moving speed of the moving body or determine a moving path. Particularly, the navigation system calculates the current location of the moving body by receiving a radio wave that represents latitude, altitude, longitude, or the like from a plurality of satellites connected to the GPS and then visually displays or acoustically informs map information including the current location to or of the driver. A car navigation system applied to the vehicle, which is being driven on a road, visually or acoustically provides various information such as a current driving road and location, a driving path of the road, a degree of congestion of the road, and the like.

The above-mentioned car navigation system receives a satellite radio wave from a GPS satellite and calculates a distance from the satellite by receiving the radio wave to detect the current location of the vehicle, and detects map data for a related region from a database and then displays the detected current location together with map information on a display unit. In addition, the car navigation system displays the driving path from a driving start location to a current driving location on the screen by determining a driving distance by a driving distance sensing unit such as a speed sensor and calculating a driving direction by an azimuth detecting unit such as a gyro sensor. Furthermore, the car navigation system increases a degree of precision of the map data stored in the database to display the driving direction on the display unit or output the driving direction by an audio output via a speaker when a change in the path is required, such as an intersection, a crossroad, or the like, for example.

The driving guide system has recently been improved toward the navigation system guiding the path as described above and a system that guides a general driving environment such as road conditions, or the like. An attempt to guide driving conditions more precisely has been made by recognizing a lane in which the vehicle is currently driven, whether a passage through which the vehicle may pass is present in front of the vehicle, and the like for performing a realistic driving guide, departing from a concept simply guiding the driving conditions based on road information on the map.

SUMMARY

Accordingly, the present invention provides an apparatus and a method for a driving guide of a vehicle that provides a start location of a passage and a width of the passage to a driver before the vehicle enters the passage by sensing obstacles present in front of the vehicle on a road on which the vehicle is driven.

In one aspect of the present invention, an apparatus for a driving guide of a vehicle may include: a sensor unit that includes at least one sensor within the vehicle; a controller configured to sense obstacles positioned at the front and side of the vehicle using sensing information received from the sensor unit and arrange data for the obstacles based on an angle to determine whether a passage is present in front of the vehicle; and an outputting unit executed by the controller to provide the driving guide toward the determined passage.

The data for the obstacles may be configured of a plurality of points that configure the obstacles and at least one line that connects the plurality of points to each other. The controller may be configured to arrange the plurality of points that configure the obstacles based on an angle of a polar coordinate system and arrange data between a plurality of obstacles according to the angle of the polar coordinate system. The controller may be configured to calculate a width of the passage using at least two points of the passage based on the arranged data. In addition, the controller may be configured to determine that the passage is not present in front of the vehicle when the obstacles are present in front of the vehicle.

In another aspect of the present invention, a method for a driving guide of a vehicle may include: analyzing, by a controller, sensing information received from a sensor unit that include at least one sensor positioned within the vehicle; sensing obstacles positioned at the front and side of the vehicle according to the analyzed result; arranging data for the sensed obstacles based on an angle; determining whether a passage is present in front of the vehicle based on the arranged result; and providing the driving guide toward the checked passage.

The arranging of the data for the obstacles based on the angle may include: extracting, by the controller, data for the obstacles configured of a plurality of points of the obstacles and at least one line that connects the plurality of points to each other; and arranging, by the controller, the plurality of points of the obstacles based on an angle of a polar coordinate system and arranging data between a plurality of obstacles based on the angle of the polar coordinate system.

The method for the driving guide of the vehicle may further include, after determining whether the passage is present, calculating, by the controller, a width of the passage using at least two points of the passage based on the arranged data. The determination of whether the passage is present may further include: determining whether the obstacles are present in a direction in which the vehicle goes forward; and determining that the passage is not present in the direction in which the vehicle goes forward when the obstacles are present.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
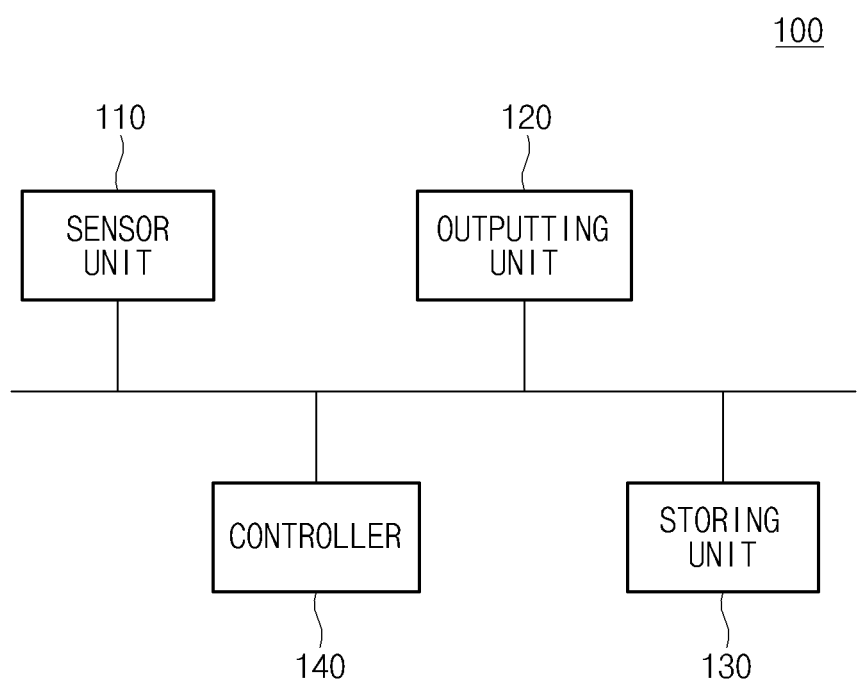
FIG. 1 is an exemplary block diagram showing a main configuration of an apparatus for a driving guide of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in more detail with reference to the accompanying drawings. However, in describing the exemplary embodiment of the present invention, technology contents well known in the art to which the present invention pertains and directly not related to the present invention will be omitted, if possible. This is to more clearly deliver the key point of the present invention so as not to obscure the present invention by omitting any unnecessary description.

FIG. 1 is an exemplary block diagram showing a main configuration of an apparatus for a driving guide of a vehicle according to an exemplary embodiment of the present invention. FIGS. 2 to 7B are exemplary views describing a method for recognizing a passage in front of the vehicle according to an exemplary embodiment of the present invention.

Referring to FIGS. 1 to 7B, an apparatus 100 for a driving guide of a vehicle (hereinafter, referred to as a driving guide apparatus) according to an exemplary embodiment of the present invention may include a sensor unit 110, an outputting unit 120, a storing unit 130, and a controller 140. Although the exemplary embodiment of the present invention described is limited to the vehicle being driven on an expressway and obstacles are other vehicles other than the vehicle being driven, but is not necessarily limited thereto. It should be understood that the exemplary embodiment of the present invention may be applied to a passage such as an alley. Moreover, although the passage used in the exemplary embodiment of the present invention means a passage formed between vehicles on the expressway, but is not necessarily limited thereto.

The sensor unit 110 may have at least one sensor mounted within the vehicle and may be configured to provide sensing information received from the sensor to the controller 140. In particular, the sensor unit 110 may include a laser radar which is a light detection and ranging (LiDAR) sensor. Since the LiDAR sensor has a substantially high recognition rate in a longitudinal direction and a lateral direction and has a substantially minimal error for adjacent obstacles, the sensor may be configured to recognize road conditions more accurately. The sensor applied to the vehicle is not limited to the LiDAR sensor and various sensors corresponding to this may be used. In addition, the sensor unit 110 may include a camera sensor (e.g., an imaging device) configured to obtain image data for the front, side, and rear of the vehicle.

Figure 7A:
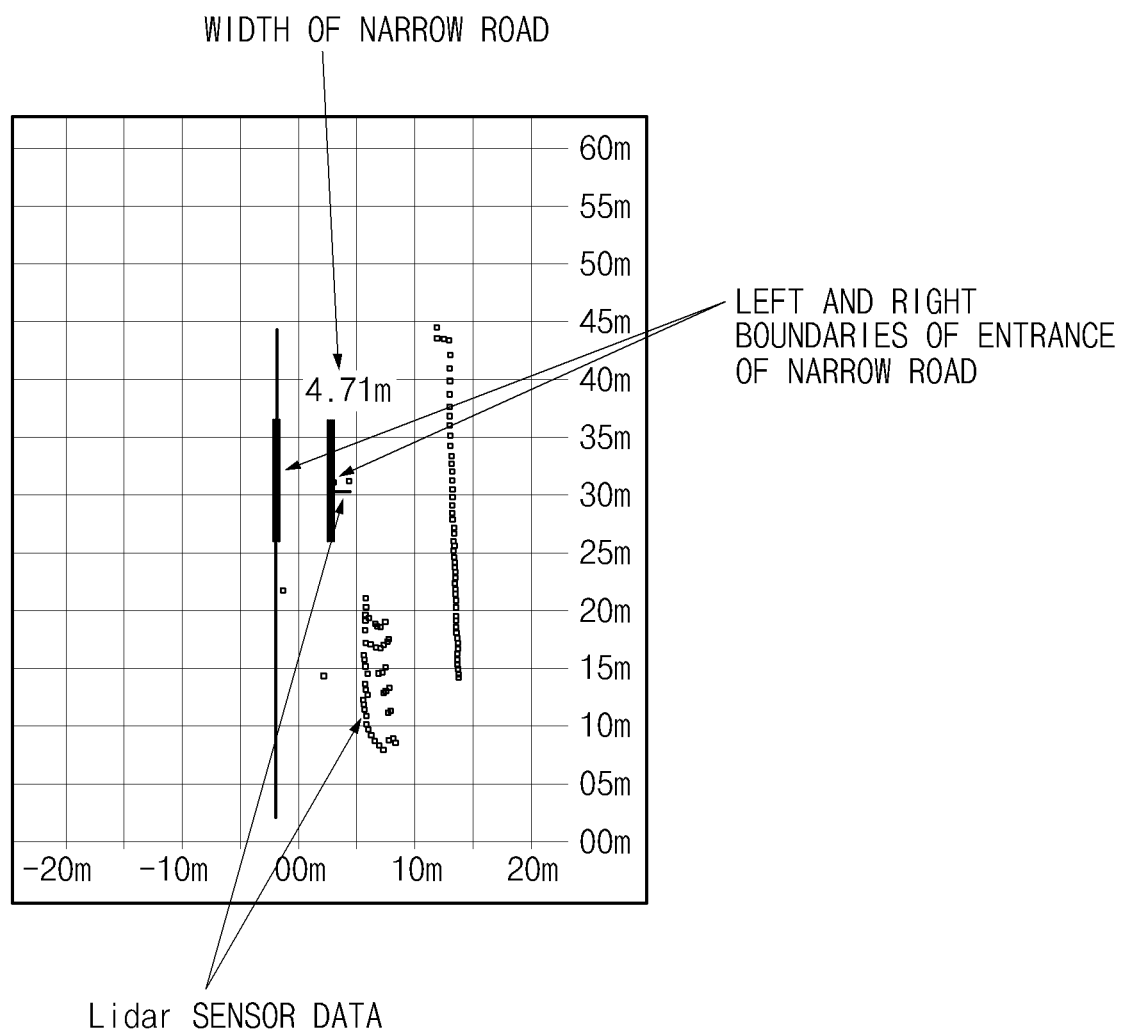
Figure 7B:
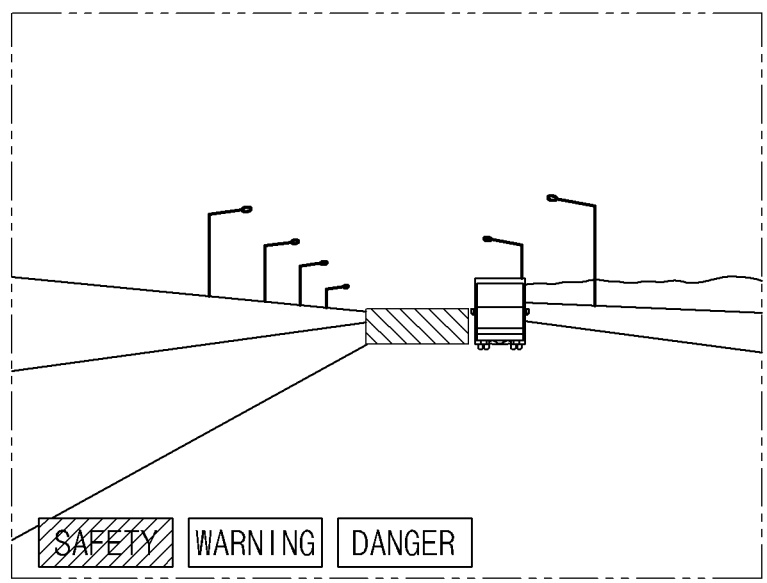

The outputting unit 120, executed by the controller 140, may be configured to output the image data for a current location of the vehicle and may be configured to provide a start location of a passage and a width of the passage before entering the passage to the driver when the vehicle enters the passage as shown in FIGS. 7A and 7B. Specifically, FIG. 7A shows data in which the width of the passage and left and right boundaries of a passage entrance determined, by the controller 140, on the road on which the vehicle is driven may be calculated, and FIG. 7B shows a screen output to the outputting unit 120 based on FIG. 7A. Therefore, a driver may determine whether the entry into the passage is safe (e.g., whether the vehicle may enter the passage), whether attention (e.g., caution) is required when entering, or whether the entry is dangerous, and the driver may prevent an accident caused by the obstacles positioned at the front of the vehicle and the passage.

The controller 140 may be configured to store on the storing unit 130 the image data of the road on which the vehicle is driven, obtained by the camera sensor and a program that recognizes the passage in the road on which the vehicle is driven, and may be configured to store various programs for operating the driving guide apparatus 100. Additionally, the controller 140 may be configured to sense the obstacles positioned at the front and side of the vehicle using the sensing information received from the sensor unit 110 and may be configured to arrange data for the obstacles based on an angle to determine whether the passage is present in front of the vehicle.

Figure 2:
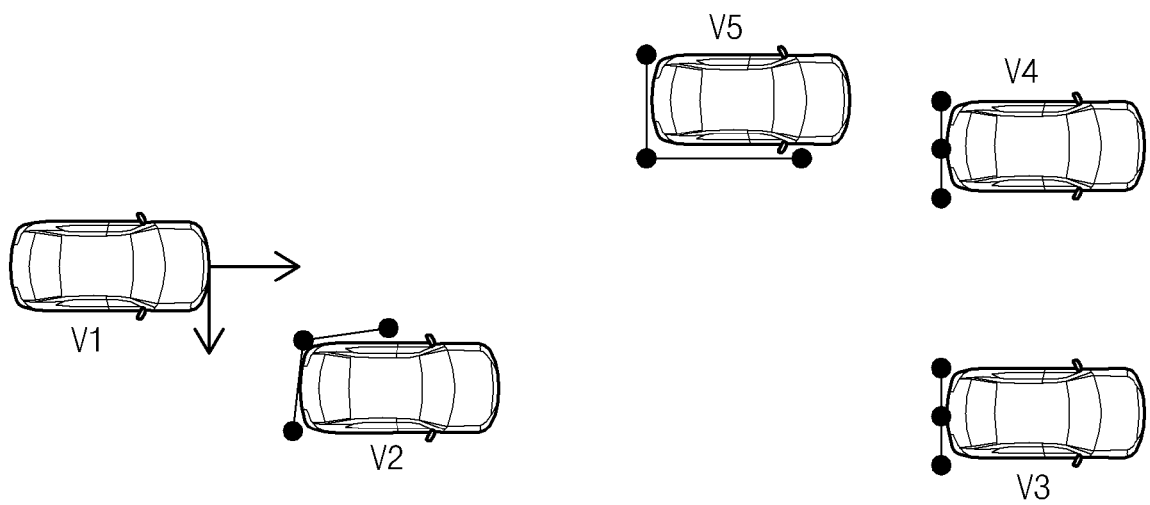
FIGS. 2 through 7B are exemplary views describing a method for recognizing a passage in front of the vehicle according to an exemplary embodiment of the present invention.

More specifically, the controller 140 may be configured to analyze the sensing information received from the sensor unit 110 to sense the obstacles positioned at the front and side of the vehicle, and extract data for the sensed obstacles (hereinafter, referred to as obstacle data). Referring to FIG. 2, the controller 140 may be configured to analyze the sensing information to determine that four other vehicles V2 to V5 are located in front and side of a vehicle V1. The controller 140 may be configured to extract a plurality of points that configure other vehicles V2 to V5 and connect the plurality of extracted points to each other using at least one line to extract the obstacle data configured of the points and the line. In FIG. 2, it may be determined that the obstacle data of other vehicles V3 and V4 configured of the three points and one line may be extracted and the obstacle data of other vehicles V2 and V5 configured of the three points and the two lines may be extracted based on the locations of other vehicles.

Figure 3:
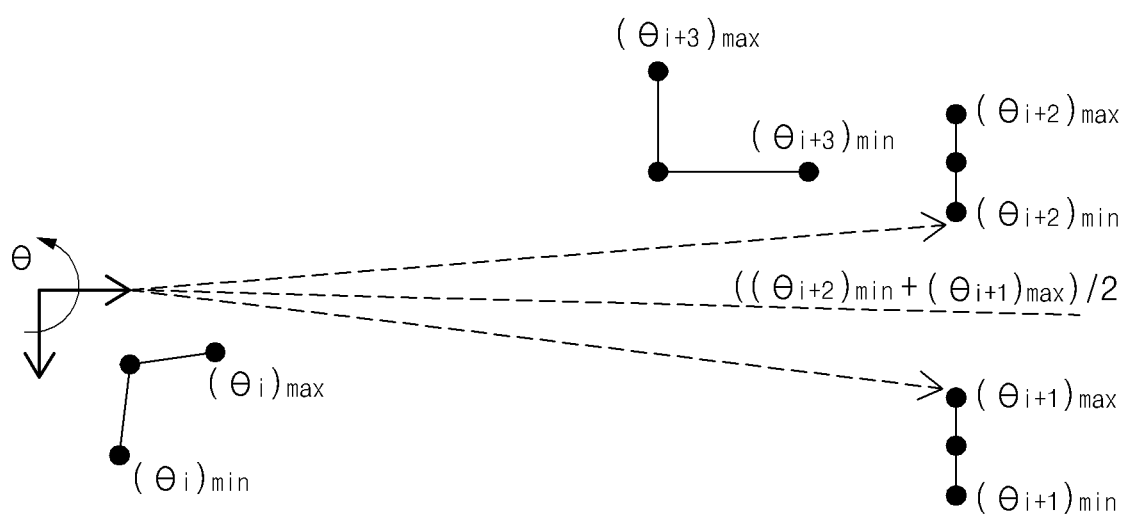
Figure 4:
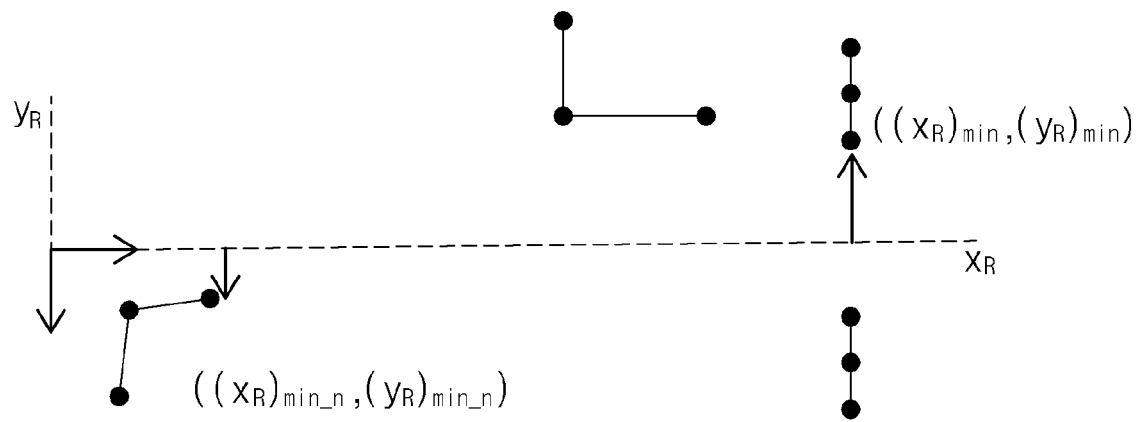

The controller 140 may be configured to arrange the extracted obstacle data based on the angle. Referring to FIG. 3, the controller 140 may be configured to arrange the extracted obstacle data based on an angle θ of a polar coordinate system. The extracted obstacle data may be arranged for the points configuring each of the other vehicles V2 to V5 and may be arranged between other vehicles V2 to V5, respectively. In particular, the polar coordinate system represents a coordinate system defining a position of any point by a distance r and a direction θ from an apex (an original point). Further, the controller 140 may be configured to determine whether other vehicles are present in front of the vehicle V1 based on the obstacle data and recognizes that the passage is not present in the road on which the vehicle V1 is driven when other vehicles are present in front of the vehicle V1.

Additionally, when other vehicles are not present in front of the vehicle V1 and other vehicles V2 to V5 are present in front and side of the vehicle V1 as shown in FIGS. 2 and 3, the controller 140 may be configured to recognize that the passage is present on the road on which the vehicle V1 is driven. The controller 140 may be configured to search for a space that has a possibility to form the passage using the arranged obstacle data as shown in FIG. 3. A conditional expression that forms the passage recognizes, as the passage, a case when a maximum value among θ values configuring one obstacle of continuous obstacles is less than a minimum value among θ values configuring a next obstacle. Therefore, in FIG. 3, since $(\theta_{i+2})_{min} > (\theta_{i+1})_{max}$, the passage may be recognized between a i+1-th obstacle (V3) and a i+2-th obstacle (V4).

The controller 140 may be configured to rotate and transform the obstacles on a reference axis which is a center angle $(\theta_{i+2})_{min}$, $(\theta_{i+1})_{max}$ (e.g., $(((\theta_{i+2})_{min}+(\theta_{i+1})_{max})/2)$) of the passage using two points $((\theta_{i+2})_{min} > (\theta_{i+1})_{max})$ configuring the passage. In particular, the controller 140 may be configured to perform a two-dimensional rotational transformation matrix as expressed in Equation 1.

$$\begin{bmatrix} x_R \\ y_R \end{bmatrix} = \begin{bmatrix} \cos\left(\left(\frac{(\theta_{i+2})_{min}+}{(\theta_{i+1})_{max}}\right)/2\right) & \sin\left(\left(\frac{(\theta_{i+2})_{min}+}{(\theta_{i+1})_{max}}\right)/2\right) \\ -\sin\left(\left(\frac{(\theta_{i+2})_{min}+}{(\theta_{i+1})_{max}}\right)/2\right) & \cos\left(\left(\frac{(\theta_{i+2})_{min}+}{(\theta_{i+1})_{max}}\right)/2\right) \end{bmatrix} \begin{bmatrix} x \\ y \end{bmatrix}$$

Equation 1 wherein, $(\theta_{i+2})_{min}$ is the angle of right end point of the left obstacles which make the passage; $(\theta_{i+1})_{max}$ is the angle of left end point of the right obstacles which make the passage;

$$\frac{((\theta_{i+2})_{min} + (\theta_{i+1})_{max})}{2}$$

is the angle of the central axis of the passage; x, y are the positions of the points (x,y) in the original coordinate system; and $x_R$, $y_R$ are the positions of the points in the rotated coordinate system.

Figure 5:
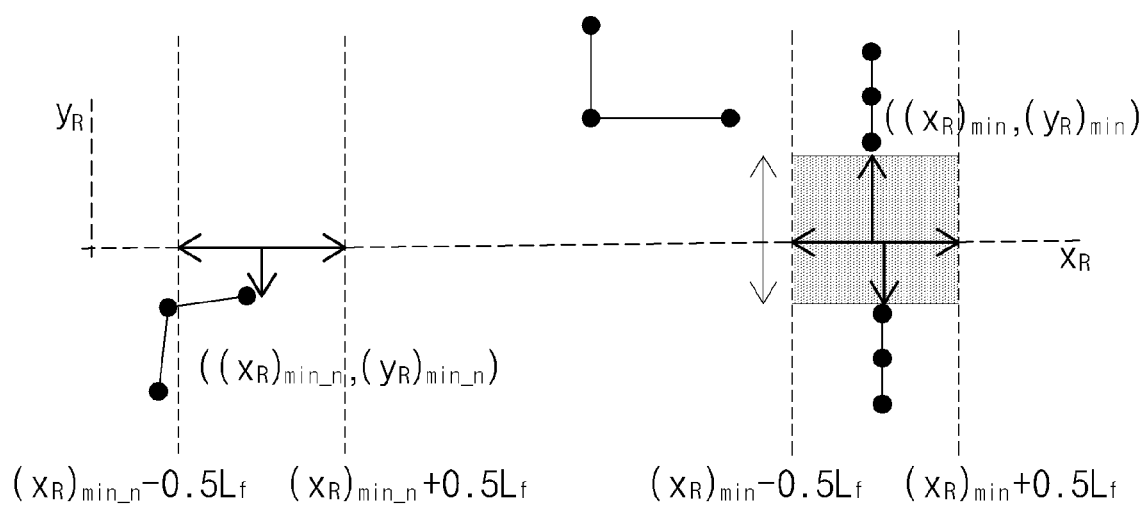

Further, the controller 140 may be configured to extract one point $((x_R)_{min}, (y_R)_{min})$ that has $y_R$ of a positive number and closest to an $x_R$ axis and one point $((x_R)_{min\_n}, (y_R)_{min\_n})$ that has $y_R$ of a negative number and closest to the $x_R$ axis based on the $x_R$ axis. This may be represented by FIG. 4. The controller 140 may be configured to calculate a width when the obstacles having $y_R$ of opposite symbols are present in a length $L_f$ for the $x_R$ axis direction based on the extracted two points. Referring to FIG. 5, the controller 140 may not configure the passage because the obstacles having $y_R$ of the positive number are not present in an interval of $((x_R)_{min\_n} - 0.5 L_f)$ and $((x_R)_{min\_n} + 0.5 L_f)$ in the $x_R$ axis direction for $((x_R)_{min\_n}, (y_R)_{min\_n})$. In addition, the controller 140 may configure the passage because the obstacles having $y_R$ of the negative number are present in an interval of $((x_R)_{min} - 0.5 L_f)$ and $((x_R)_{min} + 0.5 L_f)$ in the axis direction for $((x_R)_{min}, (y_R)_{min})$.

Figure 6A:
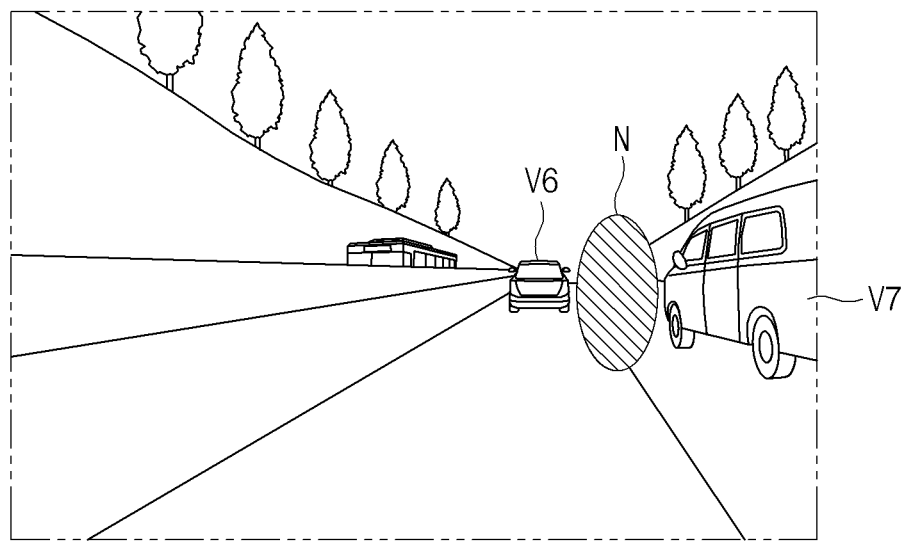
Figure 6B:
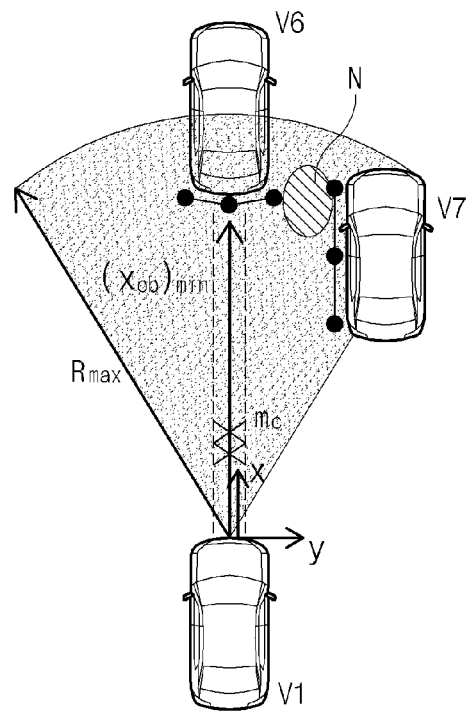
Figure 6C:
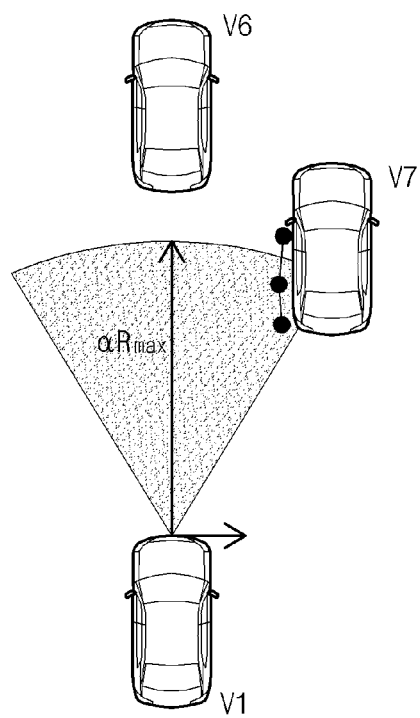

Furthermore, the controller 140 may be configured to calculate the width of the passage using a difference between the $y_R$ values of the obstacles that form the passage. The controller 140 may be configured to compare the calculated width of the passage and the width of the vehicle V1 to each other and divide the compared result into danger, warning, safe stages to output the result to the outputting unit 120. The controller 140 may be configured to recognize that the passage is not present on the road on which the vehicle V1 is driven when other vehicles are present in front of the vehicle V1. Referring to FIGS. 6A to 6C, the controller 140 may be configured recognize a space N between V6 and V7 as the passage when it is recognized that the other vehicle V6 is present in front of the vehicle V1 and the other vehicle V7 is present in front and side of the vehicle V1, as shown in FIG. 6A. This may be schematically represented by FIG. 6B. Therefore, the controller 140 may be configured a range of obstacles from an existing $R_{max}$ to $\alpha R_{max}$ when other vehicles are present in front of the vehicle V1, wherein α is set to any number which is less than about 1. This may be represented by FIG. 6C. By this result, the controller 140 may not be configured to recognize the other vehicle V6 located in front of the vehicle V1 as the obstacle.

Figure 8:
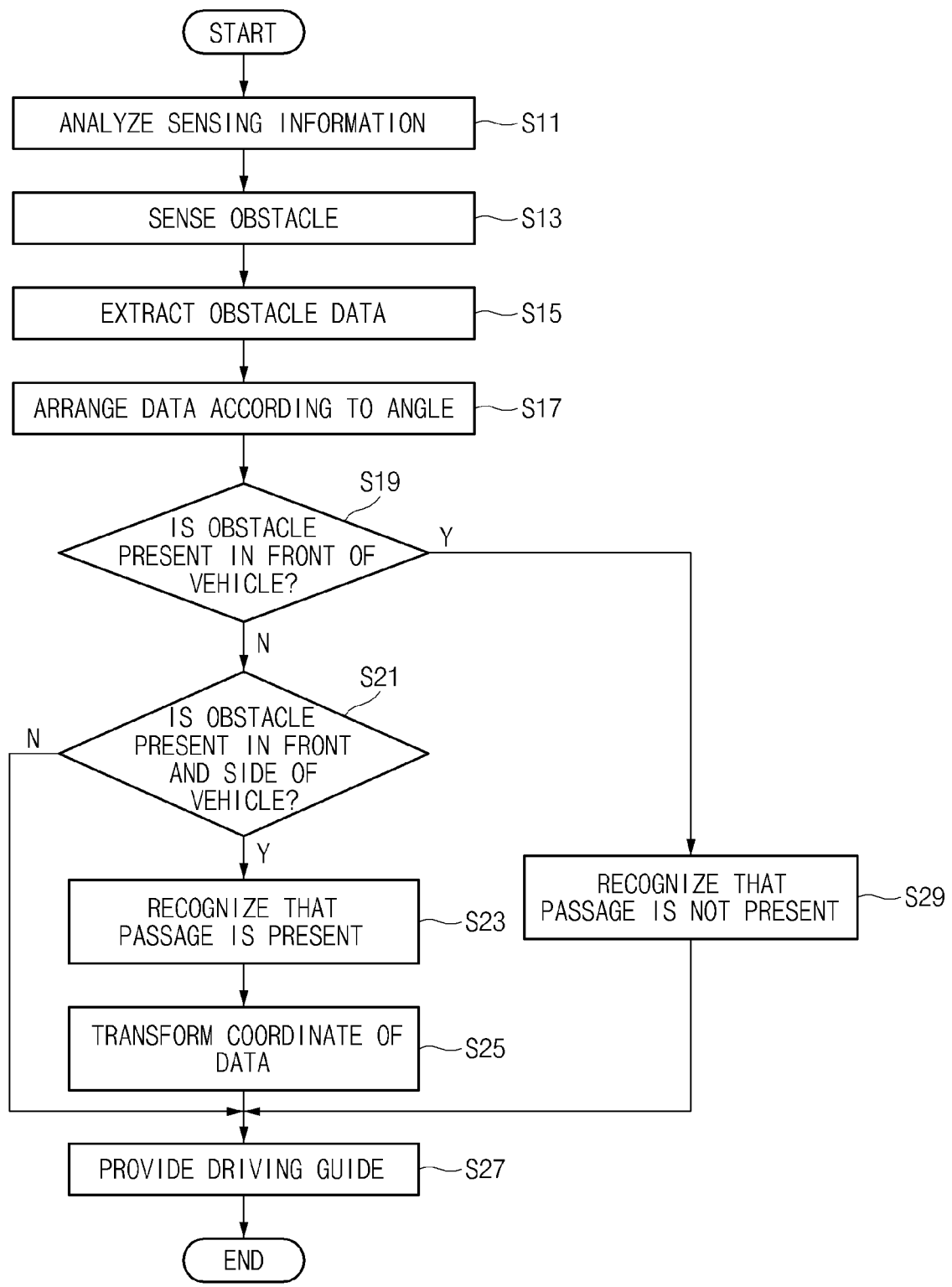
FIG. 8 is an exemplary flow chart describing a method for a driving guide of a vehicle according to an exemplary embodiment of the present invention.

FIG. 8 is an exemplary flow chart for describing a method for a driving guide of a vehicle according to an exemplary embodiment of the present invention. Referring to FIG. 8, the controller 140 may be configured to analyze the sensing information received from the sensor unit 110 in S11 and sense (e.g., detect) other vehicles (obstacles) positioned at the front and side of the vehicle based on the analyzed sensing information in S13. The controller 140 may be configured to extract data for the sensed obstacles in S15. In addition, the controller 140 may be configured to extract a plurality of points of other vehicles positioned at the front and side of the vehicle and connect the extracted points to each other using at least one line to extract the obstacle data configured of the points and the line.

Furthermore, the controller 140 may be configured to arrange the extracted obstacle data according to the angle of the polar coordinate system in S17. In particular, the controller 140 may be configured to perform an arrangement for a plurality of points of one different vehicle and perform an arrangement between a plurality of other vehicles. The controller 140 may be configured to determine whether the obstacles, that is, other vehicles are present in front of the vehicle in S19, may proceed to S29 when other vehicles are present in front of the vehicle, and may proceed to S27 after recognizing that the passage is not present in front of the vehicle. The controller 140 may be configured to output the image data received from the camera sensor to the outputting unit 120 and provide the driving guide to the driver in S27. Since this is described in the examples with reference to FIGS. 6A to 6C, a detailed description thereof will be omitted.

Moreover, when other vehicles are not present in front of the vehicle in S19, the controller 140 may proceed to S21 and when the obstacles are not present in front and side of the vehicle in S21, the controller 140 may be configured to recognize that the passage is not present in front of the vehicle and then proceeds to S27. The controller 140 may be configured to output the image data received from the camera sensor to the outputting unit 120 and provides the driving guide to the driver in S27. Additionally, the controller 140 may be configured to determine whether at least two obstacles, that is, other vehicles are present in front and side of the vehicle in S21. When at least two other vehicles are present in front and side of the vehicle, the controller 140 may be configured to recognize a space between at least two other vehicles as the passage in S23 and may proceed to S25. Since this is described in the example with reference to FIG. 3, a detailed description thereof will be omitted.

The controller 140 may be configured to perform a coordinate transformation of the obstacle data and calculate a width of the space recognized as the passage in S25. Since this is described in the examples with reference to the Equation 1 and FIGS. 4 and 5, a detailed description thereof will be omitted. Further, the controller 140 may be configured to compare the width of the passage calculated in S25 and the width of the vehicle and divide the compared result into the danger, warning, safe stages to output the compare result to the outputting unit 120 in S27. This may be represented by FIG. 7B.

As set forth above, according to the exemplary embodiment of the present invention, the obstacles present in front of the vehicle on the road on which the vehicle is driven may be sensed and the start location of the passage and the width of the passage may be provided to a driver before the vehicle enters the passage, such that the driver may prevent an accident caused by the obstacles and the passage located in front of the vehicle.

Hereinabove, the apparatus and the method for the driving guide of the vehicle according to the exemplary embodiments of the present invention have been described with reference to the exemplary embodiment of the present invention. The exemplary embodiments of the present invention have been disclosed in the present specification and the accompanying drawings and specific terms have been used, but are just used in a general mean in order to easily describe the technical content of the present invention and assist in understanding the present invention and do not limit the scope of the present invention. It is obvious to those skilled in the art to which the present invention pertains that various modifications may be practiced based on the technical idea of the present invention, in addition to the exemplary embodiments disclosed herein.

What is claimed is:

1. An apparatus for a driving guide of a vehicle, the apparatus comprising:
   a sensor unit that includes at least one sensor mounted within the vehicle; and
   a controller configured to:
   sense obstacles positioned at a front and a side of the vehicle using sensing information received from the sensor unit;
   arrange data for the obstacles based on an angle;
   calculate a reference axis along a center angel between a first and second obstacle the sensed obstacles;
   calculate a first distance between the reference axis and the first obstacle and second distance between the reference axis and the second obstacle;
   determine whether a passage between the first and second obstacle through which the vehicle can pass is present based on a sum of the first and second distance; and
   provide the driving guide for the checked passage.

2. The apparatus for the driving guide of the vehicle according to claim 1, wherein the data for the obstacles is configured of a plurality of points of the obstacles and at least one line that connects the plurality of points.

3. The apparatus for the driving guide of the vehicle according to claim 2, wherein the controller is further configured to arrange the plurality of points of the obstacles based on an angle of a polar coordinate system and arrange data between a plurality of obstacles based on the angle of the polar coordinate system.

4. The apparatus for the driving guide of the vehicle according to claim 3, wherein the controller is further configured to calculate a width of the passage using at least two points of the passage based on the arranged data.

5. The apparatus for the driving guide of the vehicle according to claim 1, wherein the controller is further configured to determine that the passage is not present in front of the vehicle when the obstacles are present in front of the vehicle.

6. A method for a driving guide of a vehicle, the method comprising:
   analyzing, by a controller, sensing information received from a sensor unit that includes at least one sensor mounted within the vehicle;
   sensing, by the controller, obstacles positioned at a front and a side of the vehicle based on the analyzed result;
   arranging, by the controller, data for the sensed obstacles based on an angle;
   calculating, by the controller, a reference axis along a center angle between a first and second obstacle of the sensed obstacles;
   calculating, by the controller, a first distance between the reference axis and the first obstacle and a second distance between the reference axis and the second obstacle;
   determining, by the controller, whether a passage between the first and second obstacle through which the vehicle can pass is present based on the sum of the first and second distance; and
   providing, by the controller, the driving guide for the checked passage.

7. The method for the driving guide of the vehicle according to claim 6, wherein the arranging of the data for the obstacles according to the angle includes:
   extracting, by the controller, data for the obstacles for a plurality of points of the obstacles and at least one line that connects the plurality of points to each other; and
   arranging, by the controller, the plurality of points of the obstacles based on an angle of a polar coordinate system and arranging data between a plurality of obstacles based on the angle of the polar coordinate system.

8. The method for the driving guide of the vehicle according to claim 7, further comprising:
   after determining whether the passage is present, calculating, by the controller, a width of the passage using at least two points of the passage based on the arranged data.

9. The method for the driving guide of the vehicle according to claim 7, wherein the determining of whether the passage is present further includes:
   determining, by the controller, whether the obstacles are present in a direction in which the vehicle is moving; and
   determining, by the controller, that the passage is not present in the direction in which the vehicle is moving when the obstacles are present.

10. A non-transitory computer readable medium containing program instructions executed by a controller, the computer readable medium comprising:
    program instructions that analyze sensing information received from a sensor unit that includes at least one sensor mounted within the vehicle;
    program instructions that sense obstacles positioned at a front and a side of the vehicle based on the analyzed result;
    program instructions that arrange data for the sensed obstacles based on an angle;
    program instructions that calculate a reference axis along a center angle between a first and second obstacle of the sensed obstacles;
    program instructions that calculate a first distance between the reference axis and the first obstacle and a second distance between the reference axis and the second obstacle;
    program instructions that provide the driving guide for the checked passage.

11. The non-transitory computer readable medium of claim 10, wherein the data for the obstacles is configured of a plurality of points of the obstacles and at least one line that connects the plurality of points.

12. The non-transitory computer readable medium of claim 11, further comprising:
    program instructions that arrange the plurality of points of the obstacles based on an angle of a polar coordinate system and arrange data between a plurality of obstacles based on the angle of the polar coordinate system.

13. The non-transitory computer readable medium of claim 12, further comprising:
    program instructions that calculate a width of the passage using at least two points of the passage based on the arranged data.

14. The non-transitory computer readable medium of claim 10, further comprising:
    program instructions that determine that the passage is not present in front of the vehicle when the obstacles are present in front of the vehicle.

* * * * *